May 9, 1950 — J. T. LEONARD — 2,506,838
COUPLING
Filed March 22, 1944
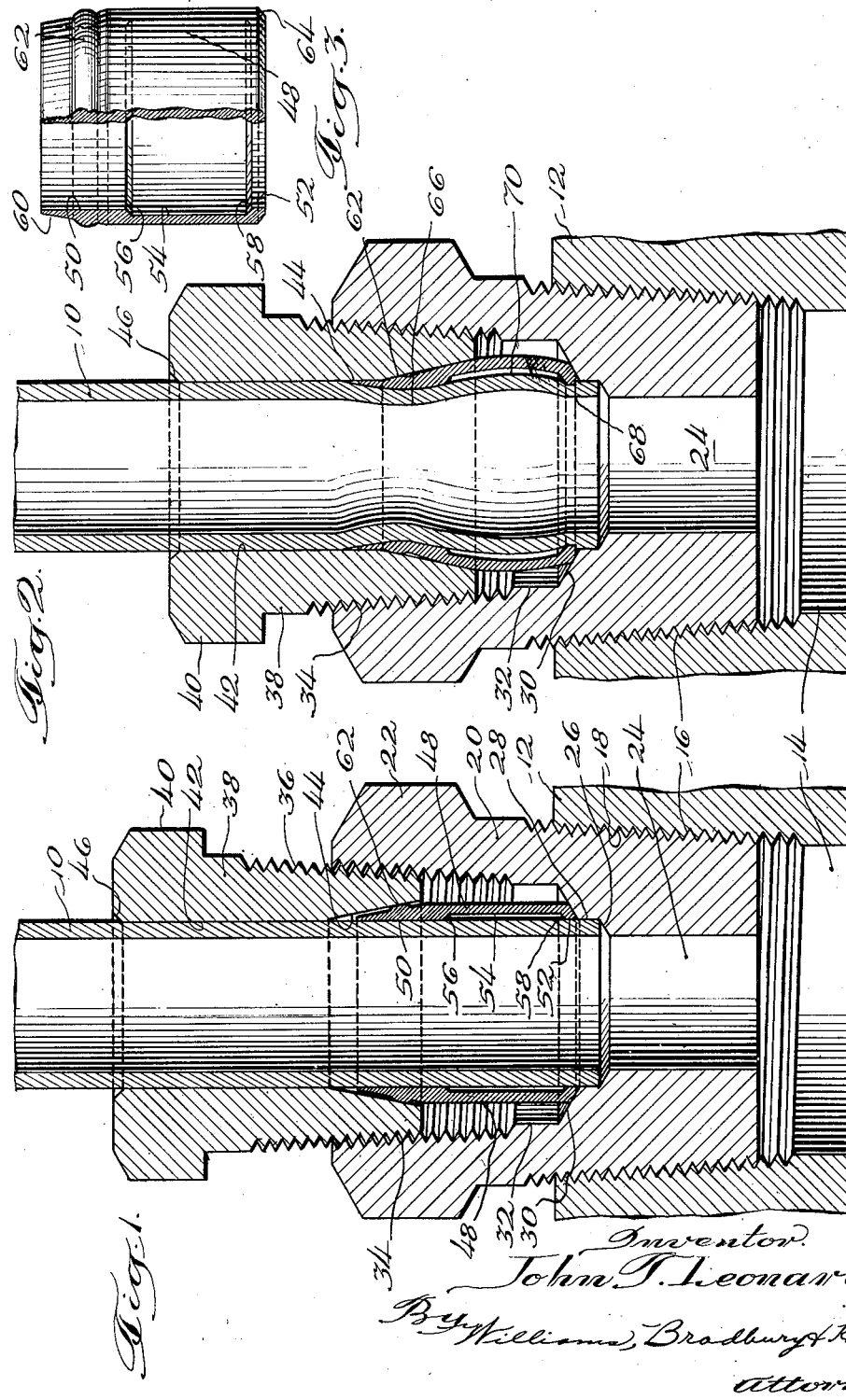

Patented May 9, 1950

2,506,838

UNITED STATES PATENT OFFICE 2,506,838

COUPLING

John T. Leonard, Evanston, Ill.

Application March 22, 1944, Serial No. 527,574

5 Claims. (Cl. 285—86)

My invention relates to couplings and more particularly to compression couplings of the kind used to attach tubing to a member having an opening designed to be placed in leak-proof communication with such tubing.

An object of my invention is to provide a new and improved coupling which is of simple construction, inexpensive to manufacture and which may be readily assembled to connect a length of tubing in leak-proof communication with a passage in an associated part.

Another object of my invention is to provide a new and improved coupling which will not break or leak when subjected to engine vibration.

Another object of my invention is to provide a new and improved coupling which effects a stronger connection between a length of tubing and an associated part.

Another object of my invention is to provide a new and improved compression ring for a tube coupling.

Other objects and advantages will become apparent as the description proceeds.

In the drawings:

Fig. 1 is a longitudinal, sectional view through a preferred embodiment of my invention showing the parts in partially assembled relationship;

Fig. 2 is a view similar to Fig. 1, but showing the parts in fully assembled relationship and providing a firm, leak-proof connection between a piece of tubing and an associated part; and Fig. 3 is a side elevation partly broken away showing a compression ring prior to assembly in the coupling.

I have illustrated my new and improved coupling as being utilized to secure one end of a piece of tubing 10 to an associated part 12, having a fluid passage 14 adapted to be placed in leak-proof communication with the tube 10. This tube 10 may be the usual copper, or other flexible tubing, used for gasoline lines and similar purposes in automotive construction and may have any usual or desired diameter. The part 12 to which the tubing is to be attached has a tapered pipe thread 16 engaged by the complementary pipe thread 18 of the fitting 20. The fitting 20 has a nut-like portion 22 whereby the fitting may be engaged by a wrench to screw it firmly into the part 12.

The fitting 20 is tubular and has a lower bore 24 terminating in a tapered shoulder 26. Immediately above the shoulder 26 is a larger bore 28 of substantially the outside diameter of the tube 10, so that this bore fits closely about the lower end of the tube, as clearly shown in the drawings. The upper end of the bore 28 terminates at a second tapered shoulder 30.

In a preferred embodiment of my invention, made for tubing of ⅜" outside diameter, the shoulders 26 and 30 form angles of 31° with the horizontal, although other suitable angles may be selected for these shoulders. Above the shoulder 30 is a still larger bore 32 merging into a tapered pipe thread 34 adapted to engage the complementary thread 36 of a tubular nut 38 having a wrench engaging portion 40. The nut has a bore 42 closely fitting the outside diameter of the tube 10 and a tapered bore 44 at its lower end merging with the bore 42. In the aforesaid embodiment of my invention, the wall of this bore 44 forms an angle of 10¼° to the vertical or axis of the nut 38. At the extreme upper end of the nut 38 the bore 42 merges into a tapered bore 46 which prevents the nut from presenting a sharp shoulder engaging the exterior of the tube 10 and thereby prevents cutting of the exterior wall of the tubing at this point.

A compression ring 48 surrounds the lower end of the tube 10 and is confined between the fitting 20 and tubular nut 38. This compression ring has a relatively long upper bore 50 and a relatively short lower bore 52, both adapted to fit closely about the lower end of the tube 10. An intermediate bore 54, longer than either the bore 50 or the bore 52, is substantially larger than the outside diameter of the tube 10 and is connected to bores 50 and 52 by tapered shoulders 56 and 58 which, in the embodiment hereinabove specifically referred to, form angles of 30° with the horizontal.

The upper end of the compression ring 48 is exteriorly tapered, as indicated at 60, and this taper is interrupted by an annular ridge 62 of circular cross section which projects slightly beyond the surface of the tapered portion of the ring. In the particular embodiment referred to, the tapered portion 60 forms an angle of 10¼° with the axis of the ring and the annular ridge 62 has a radius of .046" and projects .005" outwardly from the tapered surface. The lower end of the compression ring 48 is exteriorly chamfered, as indicated at 64, and in the aforesaid embodiment this chamfer forms an angle of 30° with the horizontal. It is to be understood that the particular embodiment herein specifically referred to is cited for purposes of illustration only and that the particular dimensions and angles may be changed to satisfy different conditions.

From Fig. 1 it will be apparent that when the coupling is loosely assembled the tapered bore 44 of the nut 38 first engages the annular ridge 62 of the compression ring 48 and the chamfered lower end 64 of this ring rests on the shoulder 30 of the fitting 20. When the nut 38 is tightened to the position shown in Fig. 2, a strong compressive force is exerted on that part of the tube 10 opposite the annular ridge 62 so that this part of the tube is contracted, as indicated at 66 in Fig. 2. At the same time the lower end of the compression ring 48 is forced down against the inclined shoulder 30 so that the lower end of the compression ring 48 is contracted about the adjacent portion of the tube and tends to contract this portion of the tube, as indicated at 68 in Fig. 2. Only a relatively narrow band at the lower end of the compression ring engages the tube 10 and this band tends to bite into the wall of the tube, as clearly indicated in Fig. 2. The intermediate portion of the compression ring is bulged outwardly, as clearly shown in Fig. 2, and the adjacent portion of the tube 10 retains its normal diameter or, in some instances, is bulged outwardly to a slight extent, as shown at 70 in Fig. 2.

As the nut 38 is screwed into the fitting 20, the lower end of the tube 10 is forced firmly against the tapered shoulder 26 in the part 12 and forms a fluid-tight seal therewith. A second seal is formed between the tube 10 and fitting 20 by the lower end of the compression ring 48, so that no fluid can escape between the fitting 20 and tube 10, except by leaking past both of these seals. The third seal is effected by the lower end of the nut 38 and upper portion of the compression ring 48, so that my novel coupling affords three separate seals, any one of which would be effective to prevent leakage of fluid. The portion of the tube extending beyond these seals is firmly supported by the upper end of the nut 38, so that these seals are not affected by vibration or other forces acting on the tube 10.

Particular attention is called to the fact that the tube 10 is contracted at two rather widely spaced portions indicated by reference characters 66 and 68, respectively. An intermediate portion 70 of the tube 10 is of normal or slightly greater than normal diameter and the extreme lower end of the tube retains its normal diameter. In order to pull the tube 10 out of the coupling it would, therefore, be necessary to exert a force sufficient to contract both of these portions of the tube or to contract the portion 70 and shear off a part of the extreme lower end of the tube. This double contraction of the tube and the bite taken into the outer wall of the tube by the lower end of the compression ring 48 provide an extremely strong coupling which secures the tube firmly to the part 12.

While I have illustrated and described only a single embodiment of my invention, it is to be understood that my invention may assume numerous other forms and that my invention includes all modifications, variations and equivalents coming within the appended claims.

I claim:

1. A coupling of the class described, comprising a fitting having a taper threaded bore for receiving one end of a tube, said fitting providing an abutment limiting insertion of said tube in said fitting, said fitting providing a tapered shoulder spaced from said abutment, a compression ring adapted to surround said tube and engage said shoulder, said compression ring comprising upper and lower portions closely fitting about said tube and an intermediate portion spaced from said tube, said compression ring being exteriorly tapered at its upper and lower ends, and a nut having a male taper thread engaging the threaded bore of said fitting, thereby limiting the adjustment of the nut therein said nut having a tapered lower end engageable with the taper at the upper end of said ring and a connecting bore closely fitting said tube.

2. A coupling of the class described, comprising a fitting having a bore for receiving one end of a tube, said fitting providing an abutment limiting insertion of said tube in said fitting, said fitting providing a relatively abruptly tapered shoulder spaced from said abutment, a compression ring adapted to surround said tube and engage said shoulder, said compression ring comprising upper and lower portions closely fitting about said tube and an intermediate portion having a thinner wall than said upper and lower portions and spaced from said tube, said compression ring being exteriorly tapered at its upper and lower ends and having its tapered upper end interrupted by an annular projection, and a nut threadedly engaging said fitting, said nut having a gradually tapered lower end engageable with the taper at the upper end of said ring and a connecting bore closely fitting said tube, the bore of the fitting providing clearance around said thin-walled portion of the ring permitting said portion to bulge when said ring is compressed longitudinally by the nut.

3. A coupling of the class described, comprising a fitting having a bore for receiving one end of a tube, said fitting providing an abutment limiting insertion of said tube in said fitting, said fitting providing a relatively abruptly tapered shoulder spaced from said abutment, a compression ring adapted to surround said tube and engage said shoulder, said compression ring comprising upper and lower portions closely fitting about said tube and a longer intermediate portion having a thinner wall than said upper and lower portions and spaced from said tube, said compression ring being exteriorly tapered at its upper and lower ends, and a nut threadedly engaging said fitting, said nut having a lower end tapered more gradually than said shoulder of the fitting and engageable with the taper at the upper end of said ring and a connecting bore closely fitting said tube, the bore of the fitting providing clearance space around said thin-walled portion of the ring to permit said portion to bulge outwardly.

4. A connection of the class described, comprising a tube and a coupling applied thereto, said coupling including a fitting having a bore, one portion of said bore being fitted closely around the end portion of said tube and terminating at an annular abutment shoulder engaging the end of the tube, said fitting having an abruptly inclined annular shoulder extending outwardly at the other end of said fitted portion of the bore, a compression ring in the form of a sleeve having end portions closely embracing the tube and an intermediate portion of approximately half the length of the sleeve having a weaker wall than said end portions spaced out of contact with the tube, and a nut having a threaded connection with said fitting for axial adjustment with respect thereto, said nut having a bore including an outer end portion fitted closely around the tube and an inner end portion flaring gradually away from the tube, one end of said sleeve having an abrupt taper bearing against the abruptly inclined shoulder of the fitting with the adjacent end portion contracted around the tube and impressed into its surface in interlocking engagement therewith, the other end of said sleeve having a gradual external taper which is wedged between the flared bore of the nut and the tube, said end portion of the sleeve being contracted and the part of the tube embraced thereby being contracted by the force of the axial adjustment of the nut relative to the fitting, the intermediate weaker wall of the sleeve being bulged outwardly and the portion of the tube enclosed thereby being also expanded laterally by the force exerted axially upon it.

5. A compression ring for securing a tube in a coupling which includes a pair of members having a threaded connection for relative axial adjustment and having aligned bores to accommodate the tube, each of said bores having a tapered portion, said tapered portions being oppositely inclined and spaced apart, said compression ring having the form of a sleeve to fit between said tapered portions of said members and having end portions dimensioned to fit closely around the tube, one end of said ring being abruptly tapered and the other end having a gradual taper with an annular projection externally disposed on said gradually tapered portion intermediate its ends to augment the contraction of this portion of the sleeve and that portion of the tube which it encompasses, said ring also having an intermediate portion comprising a substantial part of the total length of the sleeve and of weaker cross-section than said end portions, whereby the axial adjustment of said members contracts the end portions of the sleeve and the portions of the tube engaged thereby and bulges the intermediate part of the sleeve and the portion of the tube between its contracted portions.

JOHN T. LEONARD.

REFERENCES CITED

The following references are of record in the file of this patent:

UNITED STATES PATENTS

| Number | Name | Date |
|---|---|---|
| 350,116 | Chapman | Oct. 5, 1886 |
| 546,732 | Desserich | Sept. 24, 1895 |
| 1,186,813 | McFerran | June 13, 1916 |
| 1,805,666 | Hukill | May 19, 1931 |
| 1,883,283 | Zerk | Oct. 18, 1932 |
| 2,150,042 | Shultz | Mar. 7, 1939 |
| 2,179,127 | Lauer | Nov. 7, 1939 |
| 2,211,856 | Kreidel | Aug. 20, 1940 |
| 2,343,922 | Parker | Mar. 14, 1944 |

FOREIGN PATENTS

| Number | Country | Date |
|---|---|---|
| 368,163 | Italy | Feb. 9, 1939 |